United States Patent [19]
Petrikas

[11] Patent Number: 6,068,176
[45] Date of Patent: May 30, 2000

[54] BRAZING ALLOY TRANSFER TAPE HAVING A VISUALLY DISTINCTIVE CARRIER

[75] Inventor: Paul A. Petrikas, Gaylordsville, Conn.

[73] Assignee: Vitta Corporation, Bethel, Conn.

[21] Appl. No.: 08/999,424

[22] Filed: Dec. 29, 1997

[51] Int. Cl.[7] ............ B23K 35/14; B23K 35/12; B32B 9/00; B44C 1/165
[52] U.S. Cl. ......... 228/56.3; 228/253; 428/41.6; 428/41.7; 428/42.1; 428/202; 156/230; 156/233
[58] Field of Search .............. 228/56.3, 253; 428/41.6, 41.7, 42.1, 202, 344, 352, 343; 156/230, 233

[56] References Cited

U.S. PATENT DOCUMENTS

| | | |
|---|---|---|
| 2,684,918 | 7/1954 | Oughton . |
| 3,190,788 | 6/1965 | Loos . |
| 3,392,899 | 7/1968 | Hoogstoel ........................ 428/624 |
| 3,537,578 | 11/1970 | Figliuzzi . |
| 4,031,279 | 6/1977 | Cremer et al. .................... 428/44 |
| 4,101,698 | 7/1978 | Dunning et al. .................. 428/31 |
| 4,344,998 | 8/1982 | Leeuw et al. . |
| 4,578,298 | 3/1986 | Nagafuchi ....................... 428/40.9 |
| 4,657,137 | 4/1987 | Johnson ........................... 206/329 |
| 5,466,540 | 11/1995 | Pai et al. ......................... 428/614 |
| 5,574,610 | 11/1996 | Schaeffer et al. ................ 428/344 |
| 5,643,667 | 7/1997 | Tsukioka ......................... 428/344 |
| 5,712,038 | 1/1998 | Yamazaki et al. ............... 42/7 |
| 5,789,068 | 8/1998 | King et al. ...................... 428/212 |

*Primary Examiner*—Patrick Ryan
*Assistant Examiner*—Kiley Stoner
*Attorney, Agent, or Firm*—St. Onge Steward Johnston & Reens LLC

[57] ABSTRACT

A brazing transfer alloy tape which includes a carrier layer that may be easily seen by the operator so that it may be removed before brazing is provided. The brazing tape consists essentially of a brazing alloy layer having two opposing surfaces, a pressure sensitive adhesive disposed on one of the two opposing surfaces of the brazing alloy layer for adhering the brazing tape to the object to be brazed, a backing layer disposed on the pressure sensitive adhesive, and a visually distinctive carrier layer attached to the other of the two opposing surfaces of the brazing alloy layer opposite the pressure sensitive adhesive. The carrier layer is such that it is easily noticeable by an operator before brazing. This is accomplished, for example, by forming the carrier layer from a colored or opaque material, or from a material having a visually distinctive pattern.

8 Claims, 1 Drawing Sheet

BRAZING ALLOY TRANSFER TAPE HAVING A VISUALLY DISTINCTIVE CARRIER

FIELD OF THE INVENTION

The present invention relates to a brazing transfer alloy tape, and more particularly to a brazing transfer alloy tape having a carrier layer to protect the brazing alloy layer.

BACKGROUND OF THE INVENTION

Brazing transfer alloy tapes are well known. Such tapes have long been used for a myriad of applications as an effective and efficient means of providing a precise method for applying controlled amounts of brazing filler metals or coating alloys. Typical brazing tapes, such as those disclosed in U.S. Pat. Nos. 3,805,373 to Savolainen, 4,325,754 to Mizuhara et al. and 5,577,655 to Mizuhara, normally include a plastic carrier layer to protect the brazing alloy layer. In all known prior art tapes, this plastic carrier layer is transparent or translucent.

Brazing tape is normally applied with the plastic carrier layer still attached to the brazing alloy layer. The operator must then remove the plastic carrier layer before the brazing alloy is brazed. If the carrier is not removed before brazing, not only is the brazing ineffective, but the parts to be brazed may be severely damaged. Because the plastic carrier layer has always been transparent or translucent, it has been difficult for an operator to determine if the plastic carrier has been removed without actually feeling the tape.

What is desired, therefore, is a brazing transfer alloy tape which includes a carrier layer which may be easily noticed by the operator so that it may be removed before brazing.

SUMMARY OF THE INVENTION

Accordingly, it is an object of the present invention to provide brazing transfer alloy tape which includes a carrier layer that may be easily noticed by the operator so that it may be removed before brazing.

These and other objects of the present invention are achieved by provision of a brazing tape consisting essentially of a brazing alloy layer having two opposing surfaces, a pressure sensitive adhesive disposed on one of the two opposing surfaces of the brazing alloy layer for adhering the brazing tape to the object to be brazed, a backing layer disposed on the pressure sensitive adhesive, and a visually distinctive carrier layer attached to the other of the two opposing surfaces of the brazing alloy layer opposite the pressure sensitive adhesive. The visually distinctive carrier layer is such that it is easily noticeable by an operator before brazing. This is accomplished, for example, by forming the carrier layer from a colored or opaque material, or from a material having a visually distinctive pattern.

The invention and its particular features and advantages will become more apparent from the following detailed description considered with reference to the accompanying drawing.

DETAILED DESCRIPTION OF THE INVENTION

Figure 1:
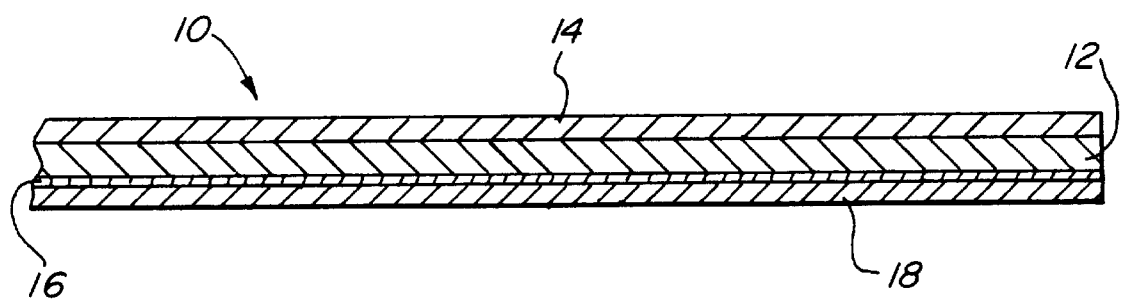
FIG. 1 is a cross-sectional view of a brazing alloy transfer tape in accordance with the present invention.

Referring to the FIG, a brazing alloy transfer tape 10 in accordance with the present invention is shown. The brazing alloy transfer tape 10 consists essentially of a brazing alloy layer 12 with a visually distinctive carrier layer 14 disposed on a surface thereof.

Brazing alloy layer 12 can be of any known composition, and most often comprises a high density layer of brazing alloy with organic binders mixed therewith. Brazing alloy transfer tape 10 is preferably formed in a long strip and then wound into a roll, as is known in the art, but may also be formed in various shapes for use in specific applications.

Visually distinctive carrier layer 14 may have a wide range of properties so long as it may be easily noticed, and thus may be removed, by an operator before brazing. Preferably the visually distinctive nature derives from visually distinctive carrier layer 14 being formed from a material having a color other than the color of the brazing alloy layer 12. With known brazing tapes having transparent or translucent carrier layers, the operator is often fooled into believing that the carrier layer has been removed because the carrier layer appears to be the color of the brazing alloy. When visually distinctive carrier layer 14 is formed from a material with a color other than the color of brazing alloy layer 12, upon inspection the operator immediately notices that visually distinctive carrier layer 14 is still attached, and may thus remove it. Other means for producing the visually distinctive nature of visually distinctive carrier layer 14 may include using an opaque material or a transparent or translucent material having a visually distinctive pattern, such as a lattice pattern. Many other alternatives may also be used, so long as visually distinctive carrier layer 14 is easily noticeable by an operator before brazing.

Preferably, brazing alloy transfer tape 10 also includes a pressure sensitive adhesive 16 for holding the tape in place before brazing. Pressure sensitive adhesive 16 may comprise a layer covering the whole surface of brazing alloy layer 12 opposite visually distinctive carrier layer 14, as shown in the FIG, or may only partially cover the surface. When pressure sensitive adhesive 16 is used, brazing alloy transfer tape 10 also preferably includes a protective backing layer 18 disposed on pressure sensitive adhesive 16. Protective backing layer 18 may be formed of any number of materials to which pressure sensitive adhesive 16 will not strongly adhere, although a waxed paper is preferred.

To use brazing alloy transfer tape 10, the operator removes protective backing layer 18, adheres the tape in place with pressure sensitive adhesive 16, notices and removes visually distinctive carrier layer 14, and brazes brazing alloy layer 12.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A brazing tape comprising:
   a brazing alloy layer having two opposing surfaces;
   a visually distinctive carrier layer disposed on one of the two opposing surfaces of said brazing alloy layer, said carrier layer comprising a colored material such that said carrier layer is visually noticeable by an operator before brazing.

2. The brazing tape of claim 1 further comprising a backing layer disposed on the other of the two opposing surfaces of said brazing alloy layer opposite said carrier layer.

3. The brazing tape of claim 1 further comprising a pressure sensitive adhesive disposed on the other of the two opposing surfaces of said brazing alloy layer opposite said carrier layer for adhering the brazing tape to the object to be brazed.

4. The brazing tape of claim 3 further comprising a backing layer disposed on said pressure sensitive adhesive.

5. A brazing tape comprising:

a brazing alloy layer having two opposing surfaces;

a visually distinctive carrier layer disposed on one of the two opposing surfaces of sold brazing layer, said carrier layer comprising a material having a visually distinctive pattern such that said carrier layer is visually noticeable by an operator before brazing.

6. A brazing tape comprising:

a brazing alloy layer having two opposing surfaces;

a pressure sensitive adhesive disposed on one of the two opposing surfaces of said brazing alloy layer for adhering the brazing tape to the object to be brazed;

a backing layer disposed on said pressure sensitive adhesive; and, a visually distinctive carrier layer attached to the other of the two opposing surfaces of said brazing alloy layer opposite said pressure sensitive adhesive, said carrier layer comprising a colored material such that said carrier layer is visually noticeable by an operator before brazing.

7. A brazing tape comprising:

a brazing alloy layer having two opposing surfaces;

a pressure sensitive adhesive disposed on one of the two opposing surfaces of said brazing alloy layer for adhering the brazing tape to the object to be brazed;

a backing layer disposed on said pressure sensitive adhesive; and, a visually distinctive carrier layer attached to the other of the two opposing surfaces of said brazing alloy layer opposite said pressure sensitive adhesive, said carrier layer comprising a material having a visually distinctive pattern such that said carrier layer is visually noticeable by an operator before brazing.

8. A brazing tape comprising:

a brazing alloy layer having two opposing surfaces;

a pressure sensitive adhesive disposed on one of the two opposing surfaces of said brazing alloy layer for adhering the brazing tape to the object to be brazed;

a backing layer disposed on said pressure sensitive adhesive; and, a visually distinctive carrier layer formed of a colored material attached to the other of the two opposing surfaces of said brazing alloy layer opposite said pressure sensitive adhesive, such that said carrier layer is visually noticeable by an operator before brazing.

* * * * *